(12) United States Patent
Chao

(10) Patent No.: US 8,401,112 B2
(45) Date of Patent: Mar. 19, 2013

(54) DIRTY PAPER PRECODING METHOD AND TRANSMITTER IMPLEMENTED BY USING PHASE RESHAPING

(75) Inventor: Hua Chao, Shanghai (CN)

(73) Assignee: Alcatel Lucent, Paris (FR)

( * ) Notice: Subject to any disclaimer, the term of this patent is extended or adjusted under 35 U.S.C. 154(b) by 22 days.

(21) Appl. No.: 13/202,859

(22) PCT Filed: Feb. 24, 2009

(86) PCT No.: PCT/CN2009/000196
§ 371 (c)(1),
(2), (4) Date: Aug. 23, 2011

(87) PCT Pub. No.: WO2010/096948
PCT Pub. Date: Sep. 2, 2010

(65) Prior Publication Data
US 2011/0305298 A1      Dec. 15, 2011

(51) Int. Cl.
*H04L 27/00* (2006.01)
(52) U.S. Cl. ......... 375/295; 375/219; 375/220; 375/296
(58) Field of Classification Search ................... 375/146, 375/219, 220, 295, 296
See application file for complete search history.

(56) References Cited

U.S. PATENT DOCUMENTS

| 7,508,882 | B2 * | 3/2009 | Adamiecki et al. | 375/291 |
| 8,165,189 | B2 * | 4/2012 | Liu et al. | 375/220 |
| 2009/0122906 | A1 * | 5/2009 | Mroueh et al. | 375/295 |

FOREIGN PATENT DOCUMENTS

| CN | 1614964 A | 5/2005 |
| CN | 1870459 A | 11/2006 |
| WO | WO2008073335 A2 | 6/2008 |

OTHER PUBLICATIONS

International Search Report for PCT/CN2009/000196 dated Dec. 3, 2009.
Huppert, et al., "On Tomlinson-Harashima precoding in 2-user degraded Gaussian broadcast channels," Information Theory and Its Applications, Dec. 7, 2008, pp. 1-6.
Yuk-Lun Chan, et al., "Modified TH-precoding with constant amplitude for indoor wireless system using QPSK," Vehicular Technology Conference, vol. 2, Apr. 26-May 1, 1996, pp. 81-814.

(Continued)

*Primary Examiner* — Ted Wang
(74) *Attorney, Agent, or Firm* — Fay Sharpe LLP

(57) ABSTRACT

A dirty paper precoding method implemented by using phase reshaping at the transmitter side, wherein the method comprises: subtracting interference signal from intended signal to obtain difference signal; determining constellation size for constellation extension according to amplitude-related information of interference signal and intended signal; extendedly mapping original constellation block of the difference signal to extended constellation block having the determined constellation size by constellation extension processing, according to the determined constellation size for constellation extension, wherein, the extended constellation block being proportionally enlarged to be closer to origin of constellation coordinate compared with original constellation block; and performing phase reshaping of each constellation point of extended constellation block corresponding to the difference signal, wherein, the phase reshaping making constellation point of extended constellation block of difference signal corresponding to specific constellation point of intended signal to be mapped into the same constellation quadrant as that of the specific constellation point.

8 Claims, 4 Drawing Sheets

OTHER PUBLICATIONS

Bin Liu, et al., "DPC-Base Hierarchical Broadcasting: Design and Implementation," IEEE Transactions on Vehicular Technology, vol. 57, No. 6, Nov. 1, 2008, pp. 3895-3900.

Hong Jiang, et al., "A Hierarchical Modulation for Upgrading Digital Broadcast Systems," IEEE Transactions on Broadcasting, vol. 51, No. 2, Jun. 1, 2005, pp. 223-229.

Hua Chao, et al., "Dirty Paper Coding with Phase Reshaping: New Integration Scheme for Broadcast and Unicast," IEEE $20^{th}$ International Symposium on Personal, Indoor and Mobile Radio Communications (PIMRC 2009), Sep. 13, 2009, pp. 2355-2359.

European Search Report.

* cited by examiner

DIRTY PAPER PRECODING METHOD AND TRANSMITTER IMPLEMENTED BY USING PHASE RESHAPING

FIELD OF THE INVENTION

The present invention relates to communication field, especially to a dirty paper precoding method and transmitter implemented by using phase reshaping at the transmitter side. A good BER (bit error rate)-Eb/N0 performance can be achieved no matter whether the amplitude of interference signal is larger, smaller or equal to the intended signal.

BACKGROUND OF THE INVENTION

The Dirty Paper Coding (DPC) principle proposed early in 1983 points out, when the transmitter side has already known the interference signal, the channel capacity is not influenced by the existence of interference signal. DPC is paid attention and thought as good study model of a variety of communication problems until it is associated with a plurality of communication problems. Its primary application is focused on digital watermarking, precoding design for eliminating interference and a variety of broadcast strategies, etc. In recent years, DPC is widely used in the field of multi-user communication.

Tomlinson-Harashima Precoding (THP) was firstly designed to eliminate inter-symbol interference (Ref 1). Under the circumstance of existence of interference, the transmitter side can transmit the intended signal to the receiver side by the process of pre-subtraction of the interference. The solution of pre-subtraction of interference is similar to pre-subtraction of multi-user interference. Therefore, THP can be easily extended to eliminate multi-user interference. After the year 2000, THP is associated with DPC and is interpreted as one-dimensional implementation of DPC (Ref 2).

THP is attractive due to its simple implementation. FIG. 1 illustrates the principle diagram of THP method with interference and additive Gaussian noise. With this technology, intended signal v of the dirty paper precoding pre-subtracts interference signal s at the transmitter side and obtains difference signal d. Then, the d modulo-M (an integer) signal is obtained via the quantization process by quantizer Q. what the transmitter sends is output signal of Q, also d modulo-M (an integer) instead of the difference signal d to make sure the output signal within the power constraint. At the receiver side, intended signal can be reconstructed as v̂, that is, the estimate signal of the intended signal after the receiving signal y is quantized by the same quantizer Q.

However the prior arts (Ref 1, 2) only discuss and solve the problem from the amplitude point of view. The inventor of the application thinks that the modulation phase should also be considered to reconstruct v from the received signal y optimally. Especially in case that interference signal s has larger amplitude than that of intended signal v, it is quite difficult for the prior arts to reconstruct the phase of intended signal. FIG. 2 and FIG. 3 show the problem of prior art in case of BPSK and QPSK respectively. For simplicity, assuming that v and s have the same modulation constellation. The interference signal s has higher amplitude than intended signal v. In FIG. 2 different constellation points of v are distinguished by different shapes while different constellation points of s are distinguished by different shadow fillings. Operation (v-s) in FIG. 1 results in the constellation points as shown in FIG. 2(c). Each constellation point shown in FIG. 2(c) has both information (comprising amplitude and phase information) of intended signal v and the interference signal s. Then modulo operation of the difference signal (v-s) will decrease the distance between different constellation points in the same quadrant. Thus, the possible constellation points of the received signal y are shown in FIG. 2d. It can be seen that the constellation of the received signal y is the enlarged constellation of signal v from QPSK to 16QAM. Furthermore, for the received signal y, different constellation points with same shapes and different shadow fillings are isolated at different quadrants. Obviously, phase reconstruction of intended signal v from the received signal y can hardly achieve. The case of QPSK is shown in FIG. 3, which has the similar problem to FIG. 2.

Ref 3 is an improvement of THP method described in Refs 1 and 2, which is named as SDPC (Structural Dirty Paper Coding). This method discusses the improvement of THP method on the assumption that the receiver side has known the modulation structure of the interference signal. FIG. 4 illustrates the principle structure of SDPC, where the source signal u is performed by quadrature amplitude modulation. By precoding the modulated signal v, since the receiver side has known the modulation structure of the interference signal and the receiver has also prior knowledge of the constellation of the received signal y; therefore, SDPC has better demodulation performance than THP. However, the phase reconstruction problem is solved to some extend at the cost that the receiver knows the modulation structure of the interference signal. This problem is shown in FIG. 5. What's more, in case that source signal and interference signal are both QPSK, the receiver side has to perform 16QAM decoding on the received signal y whose constellation is enlarged to reconstruct the phase of source signal.

Ref 1, 2, 3 are listed as below.

Ref 1: H. Harashima and H. Miyakawa, "Matched Transmition technique for channels with intersymbol interference", IEEE Trans. Commun., vol 20, pp. 774-780, August 1972

Ref 2: W. Yu and J. M. Cioffi, "Trellis precoding for the broadcast chamiel", in Proc. IEEE Global Telecommunications Cont. GLOBLECOM'2001)

Ref 3: Bin Liu, Hui Liu, Sumit Roy, "Structured dirty paper coding with known Interference structure at receiver" IEEE Signal Systems and Computers, 2005

SUMMARY OF THE INVENTION

The present invention is proposed in order to overcome the aforesaid drawbacks. Therefore, the purpose of the present invention is a dirty paper precoding method and transmitter implemented by using phase reshaping at the transmitter side. A good BER-Eb/N0 performance can be achieved no matter whether the amplitude of interference signal is larger, smaller or equal to the intended signal.

In order to achieve aforesaid purpose, a dirty paper precoding method implemented by using phase reshaping at the transmitter side is proposed according to the present invention, comprising: subtracting interference signal from intended signal to obtain difference signal; determining constellation size for constellation extension according to amplitude-related information of interference signal and intended signal; extendedly mapping original constellation block of the difference signal to extended constellation block having the determined constellation size by constellation extension processing, according to the determined constellation size for constellation extension, the extended constellation block being proportionally enlarged to be closer to origin of constellation coordinate compared with original constellation block; and performing phase reshaping of each constellation point of extended constellation block corresponding to the difference signal, the phase reshaping making constellation point of extended constellation block of difference signal corresponding to specific constellation point of intended signal to be mapped into the same constellation quadrant as that of the specific constellation point.

Preferably, the amplitude-related information is amplitudes of intended signal and interference signal.

Preferably, the amplitude-related information is constellation block size of interference signal and constellation block size of intended signal.

Preferably, the intended signal is modulated signal.

Furthermore, a transmitter for implementing dirty paper precoding method by using phase reshaping is proposed according to the present invention, comprising: means for obtaining difference signal, for subtracting interference signal from intended signal to obtain difference signal; means for determining constellation size, for determining constellation size for constellation extension according to amplitude-related information of interference signal and intended signal; means for extended constellation mapping, for extendedly mapping original constellation block of the difference signal to extended constellation block having the determined n size by constellation extension processing, according to the determined constellation size for constellation extension, the extended constellation block being proportionally to be closer to origin of constellation coordinate compared with original constellation block; and means for phase reshaping, for performing phase reshaping of each constellation point of extended constellation block corresponding to the difference signal, the phase reshaping making constellation point of extended constellation block of difference signal corresponding to specific constellation point of intended signal to be mapped into the same constellation quadrant as that of the specific constellation point.

Preferably, the amplitude-related information is amplitudes of intended signal and interference signal.

Preferably, the amplitude-related information is constellation block size of interference signal and constellation block size of intended signal.

Preferably, the transmitter further comprises: modulation means modulating source signal to obtain the intended signal.

BRIEF DESCRIPTION OF THE DRAWINGS

By referring to the detailed description of the used preferable embodiments with reference to the following drawings, aforesaid objects, advantages and features of the present invention will become apparent, wherein.

DETAILED DESCRIPTION OF EMBODIMENTS

In the followings, the preferable embodiments of the present invention are described with reference to the drawings.

Figure 6:
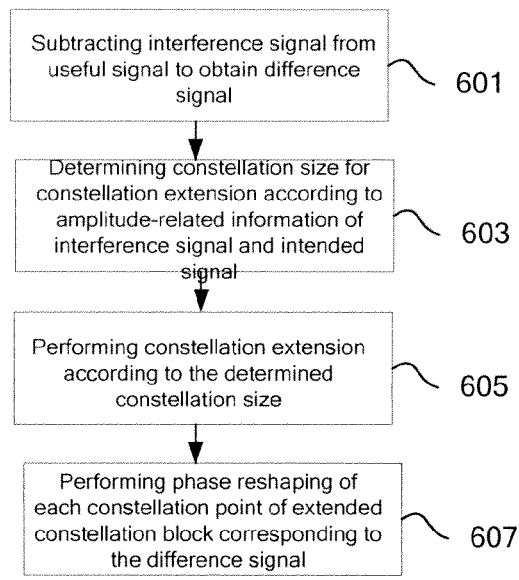
FIG. 6 is a flowchart of a dirty paper precoding method implemented by using phase reshaping at the transmitter side according to the present invention.

FIG. 6 is a flowchart of a dirty paper precoding method implemented by using phase reshaping at the transmitter side according to the present invention.

As shown in FIG. 6, in step 601, subtracting interference signal s from intended signal v to obtain difference signal b.

In step 603, determining constellation size for constellation extension according to amplitude-related information of intended signal v and interference signal s.

Figure 8:
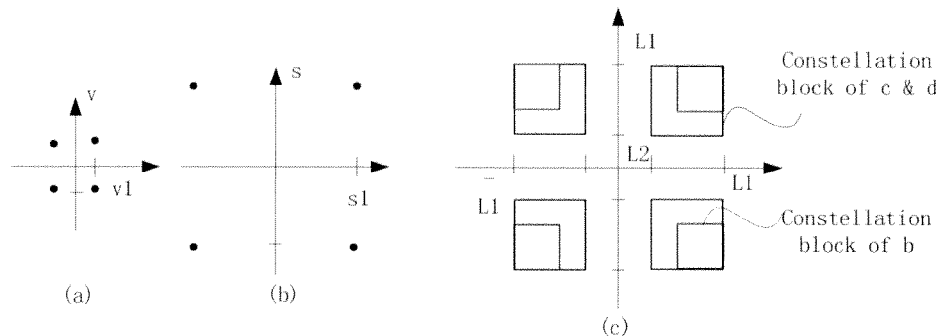
FIG. 8 is a schematic diagram of determining constellation size for constellation extension according to a first embodiment of the present invention.

FIG. 8 is a schematic diagram of determining constellation size for constellation extension according to a first embodiment of the present invention.

As shown in FIG. 8, the transmitter determines the constellation size for constellation extension of difference signal b according to amplitude of intended signal v and interference signal s (v1 and s1 in FIG. 8). From the example shown in (a) and (b) of FIG. 8, it is seen that both intended signal and interference signal are QPSK modulated. The constellation size of intended signal v and interference signal s can be determined via amplitude v1 and s1.

The constellation size of difference signal b is determined by ±L1 and ±L2. In other words, for example in the first quadrant, x-coordinate and y-coordinate of constellation point of difference signal b are both within the range [L2, L1].

Assuming s1=α·v1, where α>0, L1 and L2 are determined according to the following rules:

$$L1 = v1 + s1 = (1+\alpha) \cdot v1 \qquad (1)$$

$$L2 = \begin{cases} (2s1 - v1)/2\alpha = \left(1 - \dfrac{1}{2\alpha}\right) \cdot v1, & \text{if } \alpha \geq 1 \\ v1 - s1 = (1-\alpha) \cdot v1 & \alpha < 1 \end{cases} \qquad (2)$$

The determining process of constellation size is applicable no matter how the power ratio between intended signal v and interference signal s is.

Figure 10:
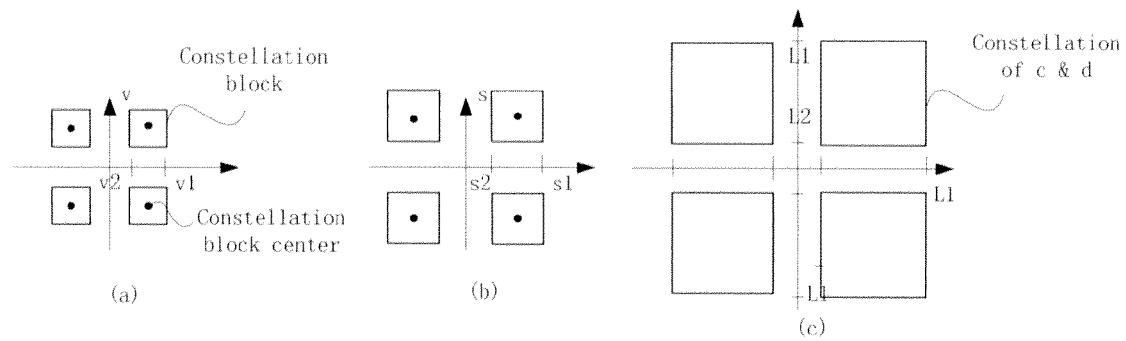
FIG. 10 is a schematic diagram of determining constellation size for constellation extension according to a second embodiment of the present invention.

FIG. 10 is a schematic diagram of determining constellation size for constellation extension according to a second embodiment of the present invention. Wherein, one or both of intended signal v and interference signal s are QAM modulation being higher than QPSK.

As shown in FIG. 10 (a), the constellation block of intended signal v can be determined by the location of constellation center in each quadrant and parameters of constellation block size (that is, v1 and v2). As shown in FIG. 10 (b), the constellation block of interference signal s can be determined by the location of constellation center in each quadrant and parameters of constellation block size (that is, s1 and s2).

Wherein, the constellation block is set defined by coordinates of all the constellation points of signal in a certain quadrant.

Assuming s1=α1·v1, s2=α2·v2, wherein α1,α2>0, then: L1 and L2 are determined according to the following rules:

$$L1 = s1 + v1 \quad (3)$$

$$L2 = \begin{cases} (2s2 - v2)/2\alpha 2 = \left(1 - \frac{1}{2\alpha 2}\right) \cdot v2, & \text{if } \alpha 2 \geq 1 \\ v2 - s2 = (1 - \alpha 2) \cdot v2 & \alpha 2 < 1 \end{cases} \quad (4)$$

In step 605, extendedly mapping original constellation block of the difference signal b to extended constellation block, namely constellation block of output signal c, having the determined constellation size ±L1 and ±L2 by constellation extension processing, according to the determined constellation size ±L1 and ±L2 for constellation extension. It can be seen that the extended constellation block, by constellation extension processing, is proportionally enlarged to be closer to origin of constellation coordinate compared with original constellation block.

As shown in FIG. 8, the original constellation size of difference signal b in x-coordinate and y-coordinate are both within the range [|α−1|·v1, (1+α)·v1]. The original constellation block is proportionally mapped into the extended constellation block of output signal c (for example in the first quadrant, x-coordinate and y-coordinate of constellation point are both within the range [L2, L1]) by constellation extension. Wherein, it needs to be pointed out in advance, the constellation block of the output signal d obtained via the phase reshaping, which will be described later, of output c, has the same size with that of the extended constellation block of output signal c.

In step 607, performing phase reshaping of each constellation point of extended constellation block c corresponding to the difference signal b. Wherein, the phase of signal denotes in which quadrant of constellation its constellation point is located. The phase reshaping makes constellation point (constellation point of the output signal c) of extended constellation block of difference signal b corresponding to specific constellation point of intended signal v to be mapped into the same constellation quadrant as that of the specific constellation point, to obtain the constellation point of output signal d.

The phase of each constellation point of extended constellation block of difference signal b is reshaped according to the phase of the intended signal v in the following way:

$$\text{real}(d) = \text{sign}(\text{real}(v)) * \text{real}(b) \quad (5)$$

$$\text{imag}(d) = \text{sign}(\text{imag}(v)) * \text{imag}(b) \quad (6)$$

In other words, this means mapping constellation point of signal c comprising signal v into the same constellation quadrant as that of signal v, to obtain the constellation point of signal d.

Figure 1:
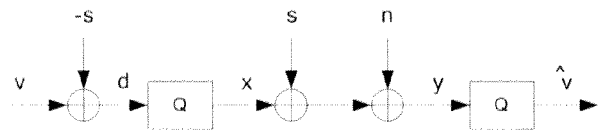
FIG. 1 is a structural schematic diagram for implementing traditional Tomlinson-Harashima precoding.
Figure 2:
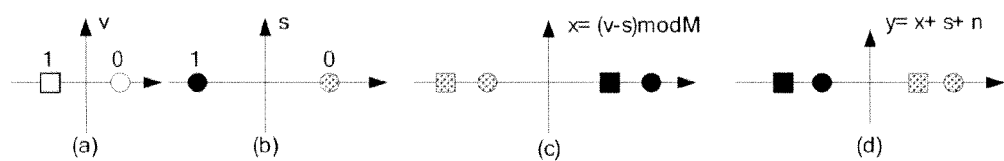
FIG. 2 is a constellation for each signal of THP in case of BPSK (Binary Phase Shift Keying)
Figure 3:
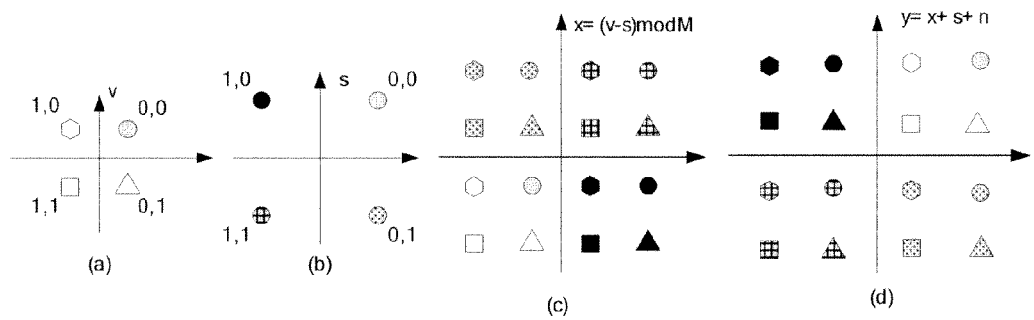
FIG. 3 is a constellation for each signal of THP in case of QPSK (Quadrature Phase Shift Keying)
Figure 4:
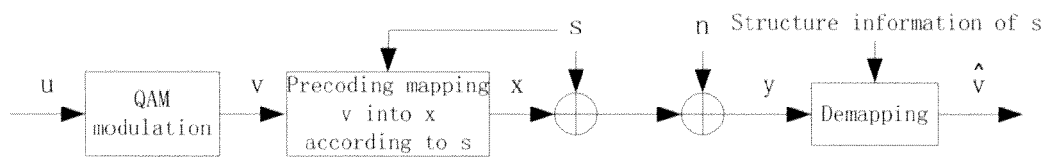
FIG. 4 is a structural schematic diagram of the SDPC precoding in the prior art.
Figure 5:
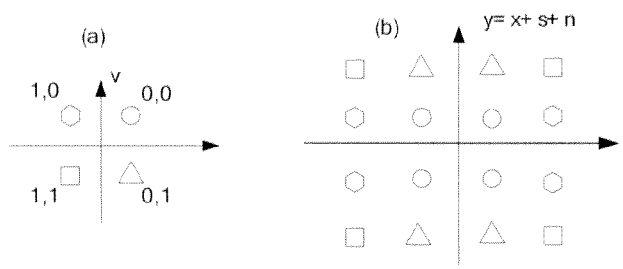
FIG. 5 is a constellation for each signal of SDPC in case of QPSK (Quadrature Phase Shift Keying)
Figure 7:
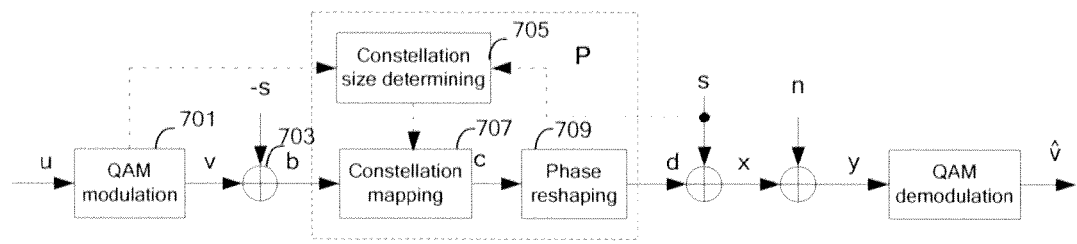
FIG. 7 is structural diagram of implementing dirty paper precoding by using phase reshaping according to the present invention.

FIG. 7 is a structural diagram of implementing dirty paper precoding by using phase reshaping according to the present invention. The solid line denotes the same data Flow as shown in FIG. 1. The function block within the dashed line block P denotes the designed dirty paper precoding strategy before transmitting, the dot and dash line represents control information.

As shown in FIG. 7, the transmitter according to the present invention comprises: a modulation means 701, a means 703 for obtaining difference signal, a means 705 for determining constellation size, a means 707 for extended constellation mapping, a means 709 for phase reshaping. The modulation means 701 is used for modulating source signal to obtain the intended signal. The means 703 for obtaining difference signal subtracts interference signal from intended signal to obtain difference signal. The means 705 for determining constellation size determines constellation size for constellation extension according to amplitude-related information of interference signal and intended signal. The means 707 for extended constellation mapping extendedly maps original constellation block of the difference signal to extended constellation block having the determined constellation size by constellation extension processing, according to the determined constellation size for constellation extension, the extended constellation block is proportionally enlarged to be closer to origin of constellation coordinate compared with original constellation block. The means 709 for phase reshaping performs phase reshaping of each constellation point of extended constellation block corresponding to the difference signal, the phase reshaping makes constellation point of extended constellation block of difference signal corresponding to specific constellation point of intended signal to be mapped into the same constellation quadrant as that of the specific constellation point.

Figure 9:
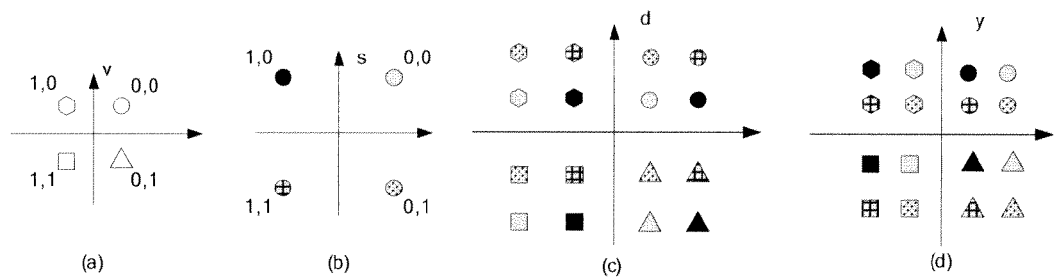
FIG. 9 is a constellation of each signal according to the first embodiment of the present invention.

Furthermore, as shown in FIG. 9, the received signal y at the receiver side keeps the phase feature of intended signal v for the reason of phase reshaping at the transmitter side, according to the present invention. Therefore, compared with the prior arts, the receiver does not need to know the modulation structure of interference signal while restructuring the intended signal according to the present invention. Furthermore, that the receiver knows the modulation structure of interference signal will narrow the application scenarios. While using THP coding to eliminate multi-user interference, it is almost impossible for the receiver to know the modulation structure of interference signal. On the other hand, according to the present invention, the receiver will not demodulate the modulated constellation (constellation of output signals c and d) after modulation extension.

FIG. 1) is a curve graph of BER performance comparison between the method of the present invention and the SDPC preceding in the prior art.

Figure 11:
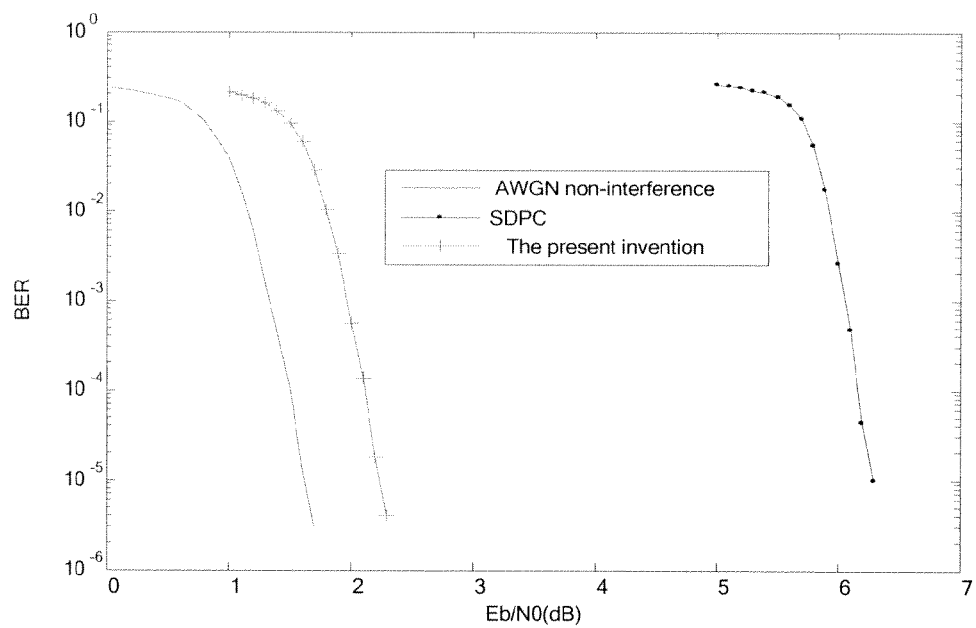
FIG. 11 is curve graph of BER performance comparison between the method of the present invention and the SDPC precoding in the prior art.

As shown in FIG. 11, the performance curve is BER to Eb/N0 of OFDM signal. In the simulation, intended signal and interference signal of DPC are both QPSK modulated signal, α=1.5, coding scheme at the transmitter side uses turbo code with code rate ⅓, the transmitting signal in the channel is OFDM signal. The receiver side uses efficient logarithm maximum a posteriori probability criteria decoding algorithm, that is, Max-log-MAP decoding algorithm. Other simulation parameters are: FFT size of OFDM signal is 512 points, channel estimation algorithm uses ideal channel estimation, channel type is AWGN single input single output channel, system bandwidth is 5M, and subcarrier OFDM interval is 15 Hz. As a reference, the performance in case of AWGN channel without interference is shown in FIG. 11. The result shows that the method according to the present invention has about 4 dB improvement compared with SDPC of the prior arts.

The detailed advantages of the present invention are listed as following:

1) achieving dirty paper precoding with better performance;

2) the present invention improves THP precoding method by considering constellation size and phase;

3) modulo operation at the receiver side is not needed compared with traditional THP precoding;

4) the present invention can be applied well no matter whether the amplitude of interference signal is larger, smaller or equal to the intended signal.

5) the receiver does not need to know the modulation structure of interference signal. Furthermore, that the receiver knows the modulation structure of interference signal will narrow the application scenes;

6) the receiver only needs to demodulate the received signal according to the modulation structure of the transmitted signal, and needs not to demodulate the actual modulation structure of the received signal whose constellation is enlarged compared with the transmitted signal;

7) the present invention enables the received signal to keep the same phase feature as the intended signal carried by it, so the present invention have better demodulation performance compared with the prior arts;

8) the present invention is a more applicable implementation of DPC and has better BER-Eb/N0 performance compared with the prior arts.

Although the present invention is shown above in combination with preferable embodiments of the present invention, the skilled in the art will understand that the present invention can be modified, replaced and changed without violating the spirit and scope of the present invention. Therefore, the present invention should not be limited by aforesaid embodiments, but be defined by the appended claims and their equivalents.

The invention claimed is:

1. A dirty paper precoding method implemented by using phase reshaping at the transmitter side, wherein the method comprises:
    subtracting interference signal from intended signal to obtain difference signal;
    determining constellation size for constellation extension according to amplitude-related information of interference signal and intended signal;
    extendedly mapping original constellation block of the difference signal to extended constellation block having the determined constellation size by constellation extension processing, according to the determined constellation size for constellation extension, the extended constellation block being proportionally enlarged to be closer to origin of constellation coordinate compared with original constellation block; and
    performing phase reshaping of each constellation point of extended constellation block corresponding to the difference signal, the phase reshaping making constellation point of extended constellation block of difference signal corresponding to specific constellation point of intended signal to be mapped into the same constellation quadrant as that of the specific constellation point.

2. The method according to claim 1, wherein, the amplitude-related information is amplitudes of intended signal and interference signal.

3. The method according to claim 1, wherein, the amplitude-related information is constellation block size of interference signal and constellation block size of intended signal.

4. The method according to claim wherein, the intended signal is modulated signal.

5. A transmitter for implementing dirty paper precoding method by using phase reshaping, wherein the transmitter comprises:
    a means for obtaining difference signal, for subtracting interference signal from intended signal to obtain difference signal;
    a means for determining constellation size, for determining constellation size for constellation extension according to amplitude-related information of interference signal and intended signal;
    a means for extended constellation mapping, for extendedly mapping original constellation block of the difference signal to extended constellation block having the determined constellation size by constellation extension processing, according to the determined constellation size for constellation extension, the extended constellation block being proportionally enlarged to be closer to origin of constellation coordinate compared with original constellation block; and
    a means for phase reshaping, for performing phase reshaping of each constellation point of extended constellation block corresponding to the difference signal, the phase reshaping making constellation point of extended constellation block of difference signal corresponding to specific constellation point of intended signal to be mapped into the same constellation quadrant as that of the specific constellation point.

6. The transmitter according to claim 5, wherein the amplitude-related information is amplitudes of intended signal and interference signal.

7. The transmitter according to claim 5, wherein, the amplitude-related information is constellation block size of interference signal and constellation block size of intended signal.

8. The transmitter according to claim 5, wherein further comprising: modulation means for modulating source signal to obtain the intended signal.

* * * * *